United States Patent [19]

Noma et al.

[11] Patent Number: 4,947,914
[45] Date of Patent: Aug. 14, 1990

[54] AIRPLANE TIRE

[75] Inventors: Hiroyuki Noma; Kazuo Oda; Takao Otani, all of Hyogo, Japan

[73] Assignee: Sumitomo Rubber Industries, Ltd., Hyogo, Japan

[21] Appl. No.: 332,361

[22] Filed: Mar. 31, 1989

Related U.S. Application Data

[63] Continuation of Ser. No. 45,218, Apr. 30, 1987, abandoned, which is a continuation of Ser. No. 770,240, Aug. 28, 1985, abandoned.

[30] Foreign Application Priority Data

Aug. 29, 1984 [JP] Japan .................................. 59-181433
Feb. 25, 1985 [JP] Japan .................................... 60-37266

[51] Int. Cl.$^5$ .............................................. B60C 9/22
[52] U.S. Cl. ..................................... 152/531; 152/536; 152/529
[58] Field of Search ............... 152/527, 528, 529, 531, 152/534, 536, 541, 543, 548, 556, 559, 532, 560

[56] References Cited

U.S. PATENT DOCUMENTS

| | | | |
|---|---|---|---|
| 3,473,594 | 10/1969 | Mirtain | 152/531 X |
| 3,693,690 | 9/1972 | Mills et al. | 152/559 |
| 3,999,585 | 12/1976 | Grawey | 152/531 |
| 4,216,813 | 8/1980 | Kerser et al. | 152/527 |
| 4,258,773 | 3/1981 | de Saint-Michel | 152/531 |
| 4,310,043 | 1/1982 | Inoue | 152/527 |
| 4,402,356 | 9/1983 | Musy | 152/531 X |
| 4,445,560 | 5/1984 | Musy | 152/527 X |
| 4,454,903 | 6/1984 | Noel et al. | 152/536 X |

FOREIGN PATENT DOCUMENTS

| | | |
|---|---|---|
| 1349247 | 12/1963 | France . |
| 1427886 | 1/1966 | France . |
| 2499473 | 8/1982 | France . |
| 1085852 | 10/1967 | United Kingdom . |
| 1163817 | 9/1969 | United Kingdom . |
| 2041843 | 9/1980 | United Kingdom . |
| 2057369 | 4/1981 | United Kingdom . |
| 2092963 | 8/1982 | United Kingdom . |
| 2092964 | 8/1982 | United Kingdom . |

OTHER PUBLICATIONS

Blow et al., *Rubber Technology and Manufacture*, Butterworth & Co. Publ., p. 220, London, 1971.

*Primary Examiner*—Raymond Hoch
*Attorney, Agent, or Firm*—Birch, Stewart, Kolasch & Birch

[57] ABSTRACT

A tire for an airplane comprises a pair of bead cores; a carcass fixed around the pair of bead cores with its ends being turned up, the carcass having cords arranged at an angle of 60° to 90° with respect to an equator plane of the tire; a belt layer having cords arranged outside the carcass at an angle of 0° to 30° with respect to the equator plane of the tire; and a band arranged above the belt layer. The band has cords which have a higher modulus of tensile elasticity than that of the cords of the belt layer. The cords of the carcass and the belt layer are made of organic fibers having a modulus of tensile elasticity not greater than 1,000 kg/mm$^2$. The tire may include a bead apex and a reinforcement layer positioned outside of the head apex. The reinforcement layer extends from a bottom of each of the pair of bead cores to a side wall of the tire.

5 Claims, 3 Drawing Sheets

AIRPLANE TIRE

This application is a continuation of application Ser. No. 045,218, filed on Apr. 30, 1987, now abandoned, which is a continuation of application Ser. No. 770,240, filed Aug. 28, 1985, now abandoned.

BACKGROUND OF THE INVENTION

FIELD OF THE INVENTION AND RELATED ART STATEMENT

This invention relates to a tire for an airplane having a sufficient load capacity, being capable of withstanding the centrifugal force generated by high speed revolutions at the time of take-off and landing of the air-plane, and being capable of effective absorption of the shock to which the body of the airplane is subjected.

Recent developments in airplane design have been remarkable and, with the trend toward increases in the weight of the airplane body and in flight speed, stricter requirements for safety in take-off and landing as well as the need for a design capable of dealing with heavy loads and high speeds have become important. The particular requirements of an airplane tire which are different from those for generally used tires incorporate the following characteristics:

(A) The airplane tire is required to absorb the shock which occurs when the airplane lands on the runway, stop the airplane safely, and permit easy take-off; these requirements must be reflected in the design of the tire structure and in the selection of reinforcing materials for the tire.

(B) The airplane tire must be designed such as to have a large degree of flexibility amounting to, for example, 28 to 38 percent, when loaded, for effectively absorbing the shock to which the airplane body is subjected and making take-off and landing safe Accordingly, selection of a tire structure sufficiently resistant to a large degree of repeated deformation and reinforcing materials of suitable quality is necessary.

(C) The weight and size of an airplane tire are limited with a view to reducing a weight of the airplane body as much as possible and, therefore, the relative load per one tire is extremely large. For example, the load on an airplane tire per unit weight thereof under standard atmosphere conditions ranges from 130 to 360 times in the case of times for general use. As regards internal pressure, this may reach as high as 10 to 16 kg/cm$^2$ in an airplane tire, in contrast to about 8 kg/cm$^2$ at the maximum in tires for general use. Therefore, an airplane tire needs to be strong enough to withstand such extremely high internal pressures.

An airplane tire must satisfy all of these requirements. However, the tires that have conventionally and broadly been used are of cross-ply structure in which carcass cords are adapted to intersect each other within a ply. Tires of such structure are low in stiffness at the tread part due to the direction in which the carcass cords are arranged and this is undesirable because of poor resistance to wear and of the tendency of generate heat. Further, the tread part bulges at the central portion due to the centrifugal force generated by high speed revolution of the tire and causes enlargement of the tire which is normally temporary but becomes permanent in certain circumstances, and this is far from satisfactory in terms of the durability and life of the, tire.

Therefore, the so-called radial structure has come to be used recently which has carcass cords arranged in the radial direction of the tire and which, in addition, is provided with a belt layer composed of highly resilient cord arranged at a comparatively small angle with respect to the direction of the tire circumference on the inner side of the tread for the purpose of increasing the stiffness thereof. This kind of radial tire, however, has a problem in that the shock absorbing effect at the time of take-off and landing of the airplane is inferior because of the arrangement of carcass cords in the radial direction of the tire and also because of the arrangement of highly resilient cords in the belt layer at a small angle with respect to the tire circumference direction. Another problem is that breakage can occur as a result of a large amount of strain at both ends of the belt layer.

OBJECTS AND SUMMARY OF THE INVENTION

This invention provides, as its object, an airplane tire which basically depends on a radial structure freed from such problems as poor resistance to wear, heat generation, and tire enlargement, while specifying the moduli of elasticity of the carcass cord, the belt layer cord and the reinforcement cord so as to increase the shock absorbing effect at the time of takeoff and landing of the airplane which has been unsatisfactory in the conventional radial structure and to prevent breakage of the belt layer at both ends.

This invention relates to an airplane tire characterized by being provided with a pair of bead cores, a carcass fixed around said pair of bead cores with its ends being turned up, said carcass having cords arranged at an angle of 60° to 90° with respect to an equator plane of the tire; a belt layer having cords arranged outside the carcass at an angle of 0° to 30° with respect to the equator plane of the tire; and a band, whose cords are higher in modulus of tensile elasticity than the belt layer, arranged above the belt layer; wherein the cords of the carcass and the belt layer are made of organic fibers having a modulus of tensile elasticity not greater than 5,000 kg/mm$^2$.

An airplane tire according to the invention may further include a reinforcement layer that is positioned outside of the bead apex and which extends from the bottom of the bead to the side wall portion and having a modulus of tensile elasticity not greater than 5,000 kg/mm$^2$.

DETAILED DESCRIPTION OF THE PREFERRED EMBODIMENTS

This invention will now be described in detail with reference to the drawings.

Figure 1:
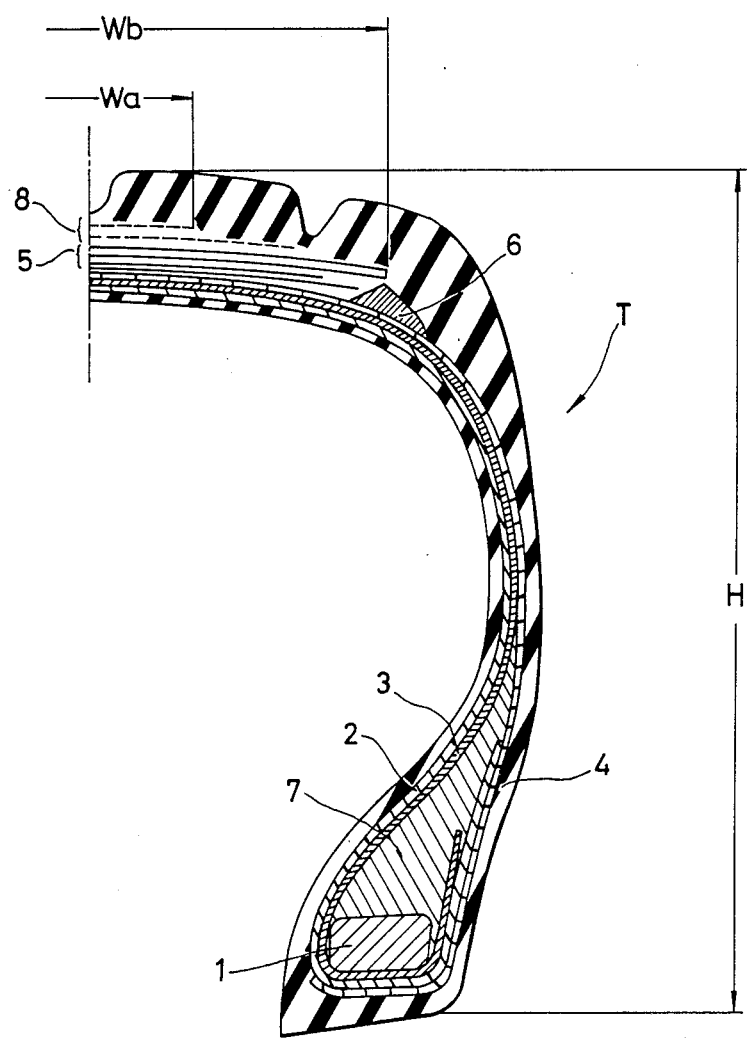
FIG. 1 is a sectional view of the right half of a tire according to an embodiment of the invention.

FIG. 1 is a sectional view showing the right half of a tire of a first embodiment of the invention and FIGS. 2A through 2D are schematic views of belt layers and bands thereof. In the drawings, a tire T is provided with a carcass composed of two carcass plies 2 and 3 each fixed to the tire while being folded at one end and extending from inside to outside around a bead core 1 and of one carcass ply 4 fixed while being folded at one end and extending from outside to inside around the bead core 1, and with a belt layer 5 and a band 8 which are made of organic fiber cords and laid outside the crown part of the carcass.

The carcass cords are arranged at an angle of 60°–90° with respect to the equator plane of the tire, and for the particular purpose of increasing the lateral stiffness of the tire, the carcass cords of one ply are preferably arranged to intersect the cords of the other ply at an angle between 5° and 10°. The cords composing the carcass and belt layer are made of organic fibers having a modulus of tensile elasticity not larger than 5,000 kg/mm$^2$, preferably, not larger than 1,000 kg/mm$^2$. An airplane tire as described above is deformed to a large extent when loaded and subjected to frequent flection due to high speed revolution of the tire.

Accordingly, it is important that not only does the airplane tire possess sufficient resistance to fatigue by flection when deformed to a great degree but that the tire is also so designed as to prevent the separation of plies between the carcass and the belt layer arising from the difference in stiffness which occurs near the boundary portions of both ends of the carcass and the belt layer. This invention, therefore, has made it possible to increase the resistance to flection by the use of organic fiber cords having a comparatively low elastic modulus, specifically one not exceeding 5,000 kg/mm$^2$, for both the carcass ply and the belt layer, and to effectively suppress the concentration of stress at the ends of a belt layer by bringing into approximate conformity with each other the two values of elastic moduli of cords composing the carcass and the belt layer.

The basic physical characteristics of organic and inorganic cords generally used for the carcass and the belt layer are listed in Table 1.

In addition to the organic fibers listed in Table 1 for use in this invention, various kinds of fibers are usable, such as polyacrylonitrile, polyethylene, polyurethane, cellulosic, and cellulose ester fibers, and, among these fibers, those having a tensile elastic modulus not higher than 1,000 kg/mm$^2$, for example, nylon 77, are preferable. If the cords of both the carcass and the belt layer are made of substantially the same material, for example, nylon 66, repeated shock exerted from the treated part to the belt layer is absorbed and mitigated by the carcass so effectively that any damage to the tread part is prevented.

have conventionally been arranged at an angle between 15° and 45° for the purpose of adjusting the "hoop effect" and the "envelope effect" of the tread portion. However, in the case of an airplane tire, such problems as bulging of the crown part of the tire, or tire enlargement, result from the centrifugal force which is generated by its revolving at very high speed. If this phenomenon continues for a prolonged period, the tire becomes permanently set in the enlarged state, thereby increasing the tendency for heat generation to occur in the entire to such an extent that its durability and service life are reduced significantly.

Therefore, according to the present invention, a band made of cords having a modulus of elasticity equal to or higher than that of the cords in the belt layer is preferably provided on the outer side of the belt layer, so that the "hoop effect" of the tire is sufficiently increased to withstand the centrifugal force generated by high-speed revolutions of the tire and to suppress the tire enlargement effectively.

In order to provide a higher tire durability, the width of the band, Wa, must be within the range of 20%–90% of the width of the belt layer, Wb. However, effective suppression of tire enlargement is expected by using two band widths one of which exceeds 90% of Wb. The cords of the band are preferably arranged at an angle of 0° in the direction of tire circumference but they may be arranged at an angle not greater than 5°. If a plurality of plies are used, a group of cords in one ply may be arranged to intersect with cords in the other ply.

Figure 2A:
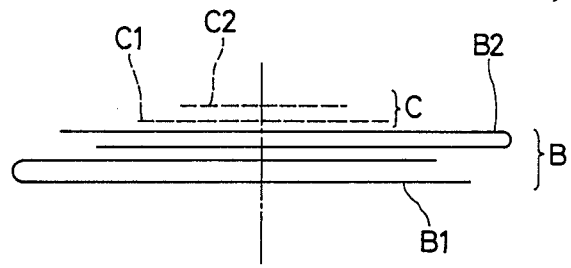
FIG. 2A to 2D are sectional views of belt layers.
Figure 2B:
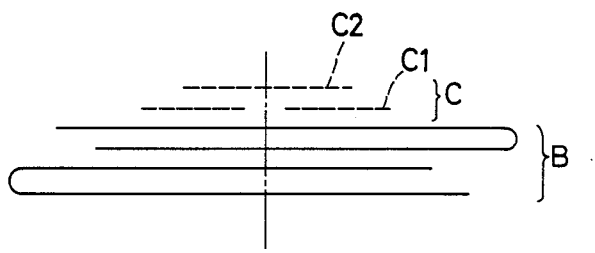
Figure 2C:
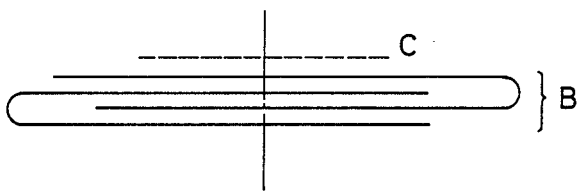
Figure 2D:
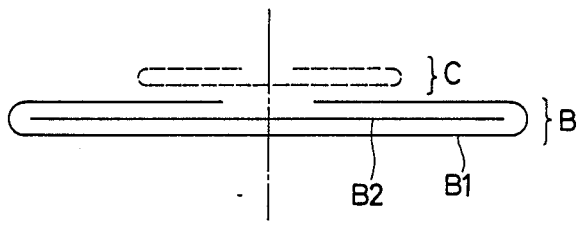

FIGS. 2A through 2D are schematic views of the arrangement of the belt layer and the band. In FIG. 2A is shown a band composed of two plies C1 and C2 arranged on a belt layer B composed of two plies B1 and B2; in FIG. 2B, a first ply C1 divided into two parts of equal length by the equator plane of the tire; in FIG. 2C, a band composed of one ply is used; and in FIG. 2D, the first ply B1 in the belt layer is folded at both ends so as to contain a non-folded 2nd ply B2 and a band composed of a folded single ply is put on the belt layer.

According to another feature of the present invention, a rubber cushion piece 6 is placed on the carcass below each end of the belt layer; the thickness of the rubber piece is the greatest in the central portion corresponding to each end of the belt layer and decreases toward both ends of the rubber piece. By using such rubber cushion pieces, any concentration of stress that may occur at both ends of the belt layer can be effectively absorbed and mitigated. The rubber cushion

TABLE 1

|  | Unit | Steel | Rayon | Polyester | Vinylon | Aramid | Nylon 66 |
| --- | --- | --- | --- | --- | --- | --- | --- |
| Modulus of tensile elasticity | kg/mm$^2$ | 16,680 | 829 | 800 | 1,235 | 4,500 | 200 |
| Tensile strength | kg/mm$^2$ | 275 | 60 | 74 | 72 | 218 | 70 |
| Breaking elongation | % | 2 | 13 | 10 | 10 | 6 | — |
| Strength per weight | g/D | 3.9 | 4.4 | 6.0 | 6.3 | 16.9 | 5.6 |
| Specific gravity |  | 7.86 | 1.52 | 1.38 | 1.28 | 1.44 | 1.14 |

According to this invention, cords that are comparatively low in modulus of elasticity are used for the belt layer and, as a result, the "hoop effect" of the belt layer is liable to be reduced However, this effect can be maintained by forming the belt of folded plies in accordance with this invention.

The above-stated cords of the belt layer are arranged at an angle not larger than 30°, preferably, not larger than 20°. Cords of the belt layer in a generally used tire piece 6 suitable for use in the present invention has a 300% modulus ranging from 70 to 150 kg/cm$^2$.

The topping rubber used in the carcass and belt layer of the tire of the present invention is relatively soft so as to accommodate the elastic moduli of cords in the carcass and the belt layer and typically has a 300% modulus of 80–160 kg/cm$^2$, preferably 90–110 kg/cm.

In FIG. 1, a bead apex 7 in the shape of a tongue may be provided to extend from the upper side of the bead core 1 to the side wall thereof, and the bead apex 7 has hardness of 70° to 95° according to JIS, and is preferably determined in height to be 15 to 50% of the cross-sectional height of the tire.

Figure 3:
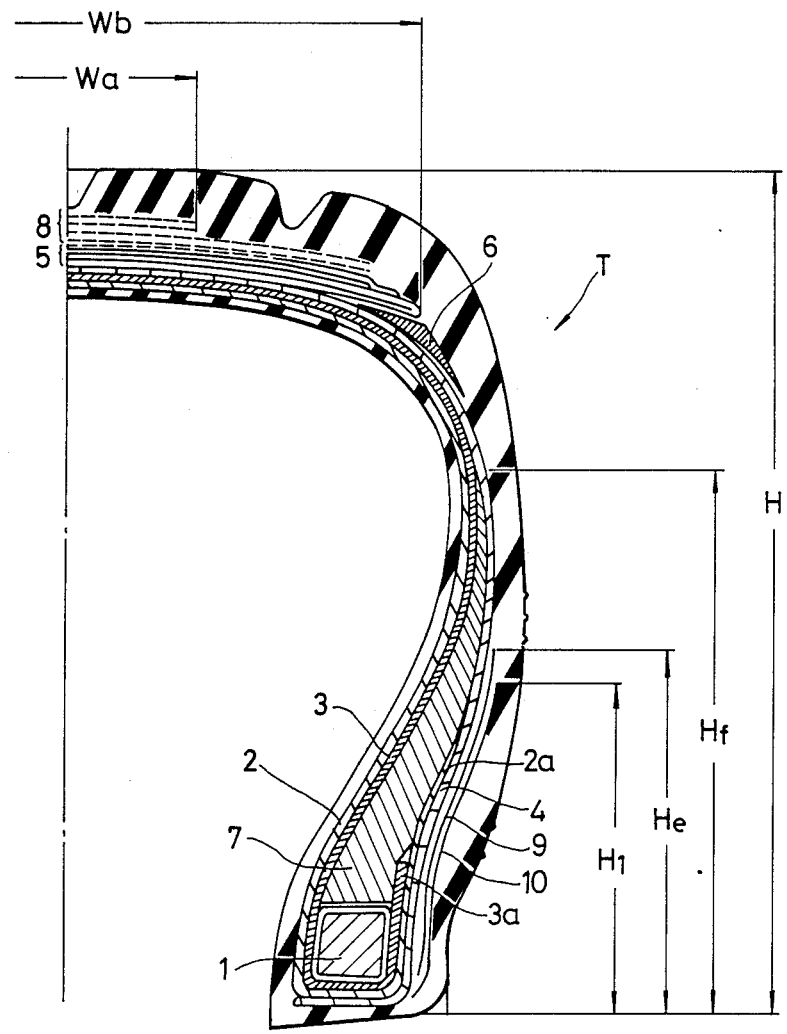
FIG. 3 is a sectional view of the right half of a tire according to another embodiment of the invention.

FIG. 3 shows another embodiment of the present invention which is provided with a bead apex 7 that lies in the area surrounded by carcasses 2, 3 and their respective folded portions 2a, 3a and which extends to a height $H_f$ that is 15%-75% of the height of the tire profile, H. The functions of this bead apex 7 are twofold: firstly, it helps the tire to be fitted more securely to a tire wheel, and secondly it enhances the lateral stiffness of the tire side portion. If the height of the bead apex 7 is less than 15% of H, these two functions of the bead apex are not fulfilled completely; if the height of the bead apex exceeds 75% of H, the shock absorbing effect of the tire is impaired. The dynamic elastic modulus of the bead apex, E, ranges from 200 kgf/cm$^2$ to 1,500 kgf/cm$^2$, and is preferably 900 kgf/cm$^2$ or higher, as measured for a sample (4 mm wide×30 mm long×2 mm thick) with a viscoelasticity spectrometer of Iwamoto Seisakusho, K.K. at 77° C. with an initial strain of 10%, an amplitude of 2.0% and a frequency of 50 Hz. By using a bead apex having such characteristic values, the tire revolving at high speed is capable of maintaining the desired lateral stiffness.

According to the present invention, reinforcement layers 9, 10 extending from the bottom of the bead toward the side wall portion are provided outside of the bead apex. Preferably, each of the reinforcement layers should be composed of at least two plies, and the cords of each ply are arranged so that they intersect each other at an angle of 30°-60° with respect to the radial direction of the tire. The heights $H_e$ and $H_f$ of the reinforcement layers 9, 10 at the top end are within the range of 20%-70%, preferably 30%-65%, of the height of tire profile, H. It is preferred that the tops of neither reinforcement layer overlap the top end of the bead apex. The reinforcement layers are made of cords having a modulus of elasticity equal to or higher than that of the cords of said carcass.

Examples

Airplane tire samples (size: 26×6.6) having the basic structure shown in FIG. 1 and the specifications listed in Tables 2 and 3 were prepared and the durability of each sample was evaluated. Durability tests were conducted in accordance with the test method specified in TSO-C62c by the U.S. Federal Aviation Administration, with the test results being shown in terms of the number of takeoffs and taxi-simulations the sample could withstand before failure.

Tables 2 and 3 listing the results of evaluation show that the tire samples prepared in the Examples wherein the reinforcement layers had heights in the ranges defined by the present invention and the cords in the belt layer were made of nylon 66 or polyester while those in the band were made of steel, Aramid or rayon performed satisfactorily in the durability tests.

TABLE 2

|  | Example 1 | Example 2 | Example 3 | Example 4 | Example 5 | Compared example 2 |
|---|---|---|---|---|---|---|
| Carcass |  |  |  |  |  |  |
| No. of plies | 3 | 3 | 3 | 3 | 3 | 3 |
| Material | Nylon 66 | Nylon 66 | Nylon 66 | Nylon 66 | Nylon 66 | Nylon 66 |
| Denier/No. of twists | 1,260d/2 | 1,260d/2 | 1,260d/2 | 1,260d/2 | 1,260d/2 | 1,260d/2 |
| Modulus of topping rubber (300%) kg/cm$^2$ | 105 | 105 | 105 | 105 | 105 | 105 |
| Belt layer |  |  |  |  |  |  |
| Structure | FIG. 2A | FIG. 2A | FIG. 2A | FIG. 2A | FIG. 2A | FIG. 2A |
| Angle of cord arrangement (with respect to tire circumference) | 17° | 17° | 17° | 17° | 17° | 17° |
| Material | Nylon 66 | Nylon 66 | Nylon 66 | Polyester | Nylon 66 | Aramid |
| Denier/No. of twists | 840d/2 | 840d/2 | 840d/2 | 840d/2 | 840d/2 | 1,500d/2 |
| Modulus of topping rubber (300%) kg/cm$^2$ | 105 | 105 | 105 | 105 | 105 | 105 |
| Band |  |  |  |  |  |  |
| Angle of cord arrangement (with respect to tire circumference | 0° | 0° | 0° | 0° | 0° | 0° |
| Material | Aramid | Steel | Rayon | Steel | Nylon 66 | Aramid |
| Denier/No. of twists | 1,500d/2 | 1 × 5/0.25 | 840d/2 | 1 × 5/0.25 | 840d/2 | 1,500d/2 |
| Modulus of topping rubber (300%) kg/cm$^2$ | 125 | 150 | 120 | 150 | 105 | 120 |
| Bead apex |  |  |  |  |  |  |
| $H_1/H \times 100$ (%) Note 2 | 32 | 32 | 32 | 32 | 32 | 32 |
| Material JIS A Hardness | 75 | 75 | 75 | 75 | 75 | 75 |
| Modulus of cushion rubber (300%) kg/cm$^2$ | 120 | 120 | 120 | 120 | 120 | 120 |
| Durability Note 1 | 61 +4 | 61 +4 | 61 +4 | 61 +4 | 61 | 50 |
| Frequency of take-off and taximulation | Not broken complete running | Not broken complete running | Not broken complete running | Not broken complete running | Not broken complete running | Tread loosened |

Note 1: TSO-C62c test specified by the U.S. FAA. The number 61 means the specified frequency and +4 means the frequency of take-off under load 1.5 times heavier than the tire.
Note 2: Ratio of height to the cross-sectional height of tire.

TABLE 3

|  | Example 4 | Example 5 | Example 6 | Example 7 | Compared example 3 | Compared example 4 |
|---|---|---|---|---|---|---|
| Carcass |  |  |  |  |  |  |
| No. of plies | 3 | 3 | 3 | 3 | 3 | 3 |
| Material | Nylon 66 | Nylon 66 | Nylon 66 | Nylon 66 | Nylon 66 | Nylon 66 |
| Denier/No. of twists | 1,260d/2 | 1,260d/2 | 1,260d/2 | 1,260d/2 | 1,260d/2 | 1,260d/2 |
| Modulus of topping rubber (300%) kg/cm$^2$ | 105 | 105 | 105 | 105 | 105 | 105 |
| Angle of cord arrangement (with respect to the equator plane of tire) | 85/85/90 | 85/85/90 | 85/85/90 | 85/85/90 | 85/85/90 | 85/85/90 |

TABLE 3-continued

|  | Example 4 | Example 5 | Example 6 | Example 7 | Compared example 3 | Compared example 4 |
|---|---|---|---|---|---|---|
| Belt layer |  |  |  |  |  |  |
| Belt width Wb, mm | 110 | 110 | 110 | 110 | 110 | 110 |
| Structure | FIG. 2A | FIG. 2A | FIG. 2A | FIG. 2A | FIG. 2A | FIG. 2A |
| Angle of cord arrangement (with respect to tire circumference) | 17° | 17° | 17° | 17° | 17° | 17° |
| Material | Nylon 66 | Nylon 66 | Nylon 66 | Polyester | Nylon 66 | Aramid |
| Denier/No. of twists | 840d/2 | 840d/2 | 840d/2 | 840d/2 | 840d/2 | 1,500d/2 |
| Modulus of topping rubber (300%) kg/cm$^2$ | 105 | 105 | 105 | 105 | 105 | 105 |
| Band |  |  |  |  |  |  |
| Band width (C2/C1), mm | 40/105 | 40/105 | 40/105 | —/1105 | — | 40/105 |
| Angle of cord arrangement (with respect to tire circumference) | 0° | 0° | 0° | 0° | 0° | 0° |
| Material | Aramid | Nylon 66 | Rayon | Nylon 66 | — | Aramid |
| Denier/No. of twists | 1,500d/2 | 840d/2 | 840d/2 | 840d/2 | — | 1,500d/2 |
| Modulus of topping rubber (300%) kg/cm$^2$ | 125 | 120 | 120 | 120 | — | 120 |
| Bead apex |  |  |  |  |  |  |
| H$_f$/H × 100 (%) | 60 | 60 | 32 | 32 | 32 | 10 |
| Material | 1,100 | 1,100 | 950 | 650 | 200 | 75 |
| Modulus of cushion rubber (300%) kg/cm$^2$ | 120 | 120 | 120 | 120 | 120 | 120 |
| Reinforcement layers |  |  |  |  |  |  |
| Angle of cord arrangement (with respect to tire radius | 45°/45° | 45°/45° | 45°/45° | 45°/45° | — | — |
| Height (H$_1$/H$_c$), mm | 55/60 | 55/66 | 55/66 | 55/66 | — | — |
| Material | Nylon 66 | Nylon 66 | Aramid | Nylon 66 | — | — |
| Durability | 61 +4 | 61 +7 | 61 +7 | 61 +2 | 35 | 30 |
| No. of take-offs and taxisimulations | Complete running without failure | complete running without failure | complete running without failure | complete running without failure | Tread loosened | Tread loosened |

Note 3: Equal to the structure shown in Fig. 2A except that no band C2 was used.

As shown above, the airplane tire of the present invention uses a specific organic fiber cord with relatively low modulus of elasticity in both the carcass and belt layer. In addition, the tire has a band positioned on the belt layer and a reinforcement layer in the bead section.

Because of these features, the tire of the present invention is protected from the "lifting" that may occur as a result of centrifugal force generated by highspeed revolution of the tire during takeoff or landing of the airplane. Furthermore, the tire effectively absorbs any shock that may otherwise be inflicted on the fuselage and exhibits excellent durability resulting from enhanced lateral tire stiffness.

the invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. An airplane tire which consists essentially of
a pair of bead cores,
a carcass of cords arranged at an angle of 60° to 90° with respect to an equator plane of said tire, said carcass of cords having ends turned up and fixed around said bead cores;
a belt layer of a width Wb having cords arranged outside a crown part of said carcass, said cords of said belt layer being inclined with each other at an angle of from 0° to 30° with respect to said equator plane of said tire and which intersect between plies of said belt layer; and
a band of cords of a width Wa arranged radially above said belt layer outside said crown part of said carcass, said cords of said band being arranged at an angle not greater than 5° to the tire circumferential direction, said cords of said tire band having a higher modulus of tensile elasticity than said cords of said tire belt layer,
wherein said cords of said carcass and said belt layer are comprised of substantially the same nylon fiber materials having a modulus of tensile elasticity not greater than 1000 kg/mm$^2$, said width Wa of said band of cords being 20 to 90% of said width Wb of said belt layer whereas the cores of said band layer and said belt layer are comprised of substantially different materials compositionally.

2. The tire of claim 1, further including a bead apex portion provided within a region surrounded by cords of said carcass inclusive of said turned up end portions of said carcass cords.

3. The tire of claim 2, further including reinforcement layers positioned outside each of said bead apex portion, said reinforcement layers extending from a bottom of each of said pair of bead cores to a side wall portion of said tire, each of said reinforcement layers being composed of at least two plies, the cords of each ply being arranged so that they intersect each other at an angle of 30° to 60° with respect to the radial direction of the tire.

4. The airplane tire of claim 1, further including a rubber cushion piece placed n said tire carcass ply below each lateral end of said belt layer.

5. The tire of claim 1, wherein said belt layer is composed of folded plies.

* * * * *